United States Patent Office 3,321,553
Patented May 23, 1967

3,321,553
POLYESTER COMPOSITIONS CONTAINING HALOGEN AND PHOSPHORUS
Nicodemus E. Boyer, Parkersburg, W. Va., and Raymond R. Hindersinn, Lewiston, and Claude Thomas Bean, Jr., Niagara Falls, N.Y., assignors to Hooker Chemical Corporation, Niagara Falls, N.Y., a corporation of New York
No Drawing. Filed June 10, 1966, Ser. No. 556,546
14 Claims. (Cl. 260—862)

This is a continuation-in-part of copending application Ser. No. 158,105, filed Dec. 8, 1961, now Patent No. 3,278,464.

This invention is directed to a highly, fire retardant polyester resinous composition having a synergistic combination of halogen and phosphorus. Fire retardant polyester resins containing halogens are well known, as are fire retardant polyester resins containing phosphorus. However, it was unexpectedly found that the polyester compositions of the instant invention, which contain both halogen and phosphorus, provide a synergistic effect on the fire retardance of the composition that is unpredictable from the fire retardance provided by either component alone.

In accordance with the invention there are provided polyester resin compositions comprised of (A) an unsaturated polyester resin having reacted therein an adduct of hexahalocyclopentadiene and a dienophile having a plurality of functional groups capable of esterification, wherein the halogen is selected from at least one member of the group consisting of fluorine, chlorine and bromine; and (B) an unsaturated polyester resin having a reactive phosphite reacted therein in an amount that is insufficient to react with all of the carbon-to-carbon double bonds of the unsaturated polyester resin. The polyester resin compositions of the invention are generally converted to thermoset resinous compositions by cross-linking the composition with an ethylenically unsaturated monomer containing the structure

in the presence of a free radical catalyst.

The halogen-containing polyester resin component of the compositions of the invention comprises a polymerizable, linear polyester resin, comprised of the reaction product of a polycarboxylic acid and a polyhydric alcohol, said resin having olefinic copolymerizable unsaturation, a component of said polyester resin containing an adduct of hexahalocyclopentadiene wherein the halogen is selected from the group consisting of fluorine, chlorine, bromine and mixtures thereof. The hexahalocyclopentadiene is preferably adducted with a compound selected from the group consisting of a polycarboxylic compound containing aliphatic carbon-to-carbon unsaturation and a polyhydric alcohol containing aliphatic carbon-to-carbon unsaturation.

The preferred unsaturated polyesters are the reaction products of (1) an adduct of hexahalocyclopentadiene and a polycarboxylic compound containing aliphatic carbon-to-carbon unsaturation, (2) a polycarboxylic compound containing aliphatic carbon-to-carbon unsaturation and (3) a polyhydric alcohol. Such a product is disclosed and claimed in U.S. Patent 2,779,701, issued Jan. 29, 1957. Other methods of incorporating either a polycarboxylic or polyhydric alcohol adduct of hexahalocyclopentadiene include: (a) the reaction of (1) a polycarboxylic adduct of hexahalocyclopentadiene and (2) an unsaturated polyhydric alcohol containing aliphatic carbon-to-carbon unsaturation, disclosed and claimed in U.S. Patent 2,863,794, issued Dec. 9, 1958; (b) the reaction of (1) an adduct of hexahalocyclopentadiene and a polyhydric alcohol containing aliphatic carbon-to-carbon unsaturation and (2) a polycarboxylic compound containing aliphatic carbon-to-carbon unsaturation, disclosed and claimed in U.S. Patent 2,779,700, issued Jan. 29, 1957; and (c) the reaction of (1) a polyhydric alcohol adduct of hexahalocyclopentadiene with (2) another alcohol containing aliphatic carbon-to-carbon unsaturation and (3) a polycarboxylic acid disclosed and claimed in U.S. Patent 2,863,795, issued Dec. 6, 1958. An alternate method for incorporating an adduct of hexahalocyclopentadiene into a polyester resin involves reacting an unsaturated polyester resin with a copolymerizable compound containing an adduct of hexahalocyclopentadiene, such as disclosed and claimed in U.S. Patent 2,783,215, issued Feb. 26, 1957. The polyester resins containing the polycarboxylic and polyhydric alcohol adducts of hexahalocyclopentadiene can be modified by incorporating therein saturated carboxylic acids and anhydrides, as disclosed and claimed in U.S. Patent 2,890,144, issued June 9, 1959, and U.S. Patent 2,898,256, issued Aug. 4, 1959. When used in this specification, the term polycarboxylic compound refers to the polycarboxylic acids, acid anhydrides, acide halides and acid esters.

A variety of unsaturated acids, acid halides, acid anhydrides, and acid esters which contain aliphatic carbon-to-carbon unsaturation can be used in either the preparation of the polycarboxylic adducts of hexahalocyclopentadiene or to provide the unsaturation in the linear polyester molecules. The polycarboxylic acids and the corresponding acid halides, esters, anhydrides, and acid esters can include maleic, chloromaleic, ethylmaleic, itaconic, citraconic, zeronic, pyrocinchoninic and acetylene dicarboxylic, either alone or in mixtures.

Illustrative of the unsaturated polyhydric alcohols which contain aliphatic carbon-to-carbon unsaturation and which can be used either in preparing the adducts of hexahalocyclopentadiene or in providing the unsaturation in the linear polyester molecules are compounds such as butene diol, pentene diol, the unsaturated hydroxy ethers such as allyl or vinyl glycerol ethers, allyl or vinyl pentaerythritol ethers and the like.

The preferred polycarboxylic adduct is 1,4,5,6,7,7-hexachlorobicyclo-(2.2.1)-5-heptene-2,3-dicarboxylic acid (commonly known as chlorendic acid), but other polycarboxylic adducts of hexahalocyclopentadiene can be used. Among these are the following:

1,4,5,6,7,7-hexachlorobicyclo-(2.2.1)-5-heptene-2,3-dicarboxylic anhydride (chlorendic anhydride);
1,4,5,6,7,7-hexachloro-2-methyl-bicyclo-(2.2.1)-5-heptene-2,3-dicarboxylic anhydride;
the mono-ethyl ester of 1,4,5,6,7,7-hexachlorobicyclo-(2.2.1)-5-heptene-2,3-dicarboxylic acid;
1,4,5,6-tetrachloro-7,7-difluorobicyclo-(2.2.1)-5-heptene-2,3-dicarboxylic acid;
1,4,5,6-tetrachloro-7,7-dibromobicyclo-(2.2.1)-5-heptene-2,3-dicarboxylic acid;
5,6,7,8,9,9-hexachloro-1,2,3,4,4a,5,8,8a-octahydro-5,8-methano-2,3-naphthalene dicarboxylic acid
1,4,5,6,7,7-hexachlorobicyclo-(2.2.1)-5-heptene-2,3-dicarbonyl chloride.

The polycarboxylic compound suitable for adduction with the hexahalocyclopentadiene are the acids, anhydrides, acid halides and acid esters.

As aforesaid, a second method of making the polyester resins of this invention comprises incorporating combined halogen into the polyester in the form of an adduct of hexahalocyclopentadiene with a polyhydric alcohol containing olefinic or carbon-to-carbon unsaturation. Among the adducts which can be so used are:

2,3-dimethylol-1,4,5,6,7,7-hexachlorobicyclo-(2.2.1)-5-heptene;
2,3,-dimethylol-1,4,5,6,7,7-hexabromobicyclo-(2.2.1)-5-heptene;
3-(1,4,5,6-tetrachloro-7,7-difluorobicyclo-(2.2.1)-5-heptene-2-yl)-methoxy-1,2-propane diol; and
3-(1,4,5,6,7,7-hexachloro-(2.2.1)-5-heptene-2-yl)-methoxy-1,2-propane diol.

The preparation of these compounds is disclosed in U.S. Patent 3,007,958.

The saturated polycarboxylic compounds useful in the preparation of the polyesters can be aliphatic, cycloaliphatic, aromatic or heterocyclic. Illustrative of these polycarboxylic acids, acid halides, acid anhydrides and acid esters include phthalic, isophthalic, terephthalic tetrachlorophthalic, adipic, succinic, and mixtures thereof.

Suitable saturated polyhydric alcohols for use in the preparation of the polyester resins include ethylene glycol, diethylene glycol, propylene glycol, dipropylene glycol, butane diol, pentane diol, hexane diol, glycerol, mannitol, sorbitol, and mixtures thereof.

The temperature for the reaction between polyhydric alcohols and polybasic acids ranges from about 100 to 200 degrees centigrade, although higher or lower temperatures can be used. Esterification catalysts such as para-toluene sulfonic acid, benzene sulfonic acid, beta-naphthalene sulfonic acid and the like, or amines such as pyridine, triethyl amine, quinoline and the like can be added to the reaction mixture. The proportion of polyhydric alcohol is approximately controlled by the total mol proportion of acids in the esterification reaction mixture. It is also prferred to react the polyhydric alcohols and polybasic acids in roughly equimolar proportion, however, either the acids or alcohols can be used in substantial excess, if it is desired to form a low molecular weight polyester resin.

The phosphorus-containing polyesters useful in the practice of the invention are unsaturated resins having reacted therein a phosphorous compound of the formula $$(RO)_nP(OH)_{3-n}$$

wherein $n$ is a number from 2 to 3. Such resins generally result from the reaction of a trialkyl phosphite or a dialkyl phosphite with an unsaturated polyester resin. Among such products are the polymeric reaction products of components comprising a reactive phosphite of the formula

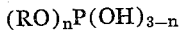

$$(RO)_3P \text{ or } H-\overset{O}{\underset{\|}{P}}-(OR)_2$$

and an unsaturated polyester resin which contains aliphatic carbon-to-carbon double bonds that are conjugated with carbonyl groups, which products have phosphorus atoms attached directly to carbon atoms which were present in the resin prior to reaction with the phosphorus compound. More particularly, the polymer of a trialkyl phosphite comprises the polymeric reaction product of a reactive phosphorus compound of the formula

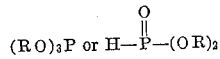

$$(RO)_3P$$

and an unsaturated polyester resin which contains at least one carboxylic acid group per molecule that is conjugated with an aliphatic carbon-to-carbon double bond. The polymers of dialkyl phosphites preferably comprise a polymeric product of the reaction conducted in the presence of an alkaline catalyst, of components comprising a reactive phosphorus compound of the formula

$$H-\overset{O}{\underset{\|}{P}}-(OR)_2$$

and an unsaturated polyester resin containing aliphatic carbon-to-carbon double bonds that are conjugated with carboxylic acid groups and which has an acid number of less than 30. In the foregoing formulas, each R is indepedently selected from the group consisting of alkyl, cycloalkyl, alkenyl, aryl, alkylaryl and arylalkyl, halo-substituted, alkoxy-substituted, aryloxy-substituted or other substituted organic radicals of the foregoing group containing substituents which do not interfere in the reaction with the ethylenically usaturated polyester. The preferred substituted groups are haloalkyl, alkoxyalkyl and aryloxyalkyl. The preferred phosphorus compounds for preparing the phosphonated polyesters are the lower alkyl phosphites such as trimethyl phosphite and dimethyl phosphite and the lower alkenyl phosphites, such as triallyl phosphite and diallyl phosphite. Other specific phosphites that can be used are those where the R radicals are methyl, ethyl, isopropyl, butyl, hexyl, n-octyl, 2-ethylhexyl, decyl, hexadecyl, phenyl, benzyl, tolyl, cyclohexyl, allyl, crotonyl, beta-chloroethyl, beta-bromoethyl, beta-methoxyethyl, beta-ethoxyethyl, beta-butoxyethyl, beta-phenoxyethyl, tetrahydrofurfuryl, tetrahydropyranyl, and mixtures thereof. Generally, it is preferred that no more than two aryl substituents be utilized. In general, the length of the carbon chains or number of carbon atoms in the aryl nuclei in the organic radicals of the phophorus compound is not critical and may vary over wide ranges. The lower limit is the lowest possible number of carbon atoms such as one carbon atom in the alkyl groups and six carbon atoms in aryl groups and the upper limit is any practical number. However, a higher percent by weight of phosphorus can be incorporated into the polymer in instances where the organic radicals attached to the phosphorus atoms in the organic radicals R preferably contain from 1 to about 6 to 8 carbon atoms. In some instances, it may be desirable to provide halogen-containing groups for R to further enhance the fire resistance and thereby obtain a still further improved polymer.

The trialkyl phosphites readily react without the aid of a catalyst with unsaturated polyester resins of the type described hereinbefore, but which are further characterized by having at least one terminal carboxylic acid group per molecule that is conjugated with an aliphatic carbon-to-carbon double bond. Usually the resins are terminated with more than one and preferably more than two such carboxylic acid groups. More particularly, the unsaturated polyester reacted with the trialkyl phosphites are those having an acid number greater than 30, preferably greater than about 100. The acid number can vary up to about 500. Recently, it has been found the terminal carboxylic acid group is not required in the polyester, if there is provided in the reaction mixture a saturated monocarboxylic acid of 2 to 18 carbon atoms, such as acetic acid, propionic acid, benzoic acid, and the like. The unsaturated polyester resins can also contain one or more internal aliphatic carbon-to-carbon double bonds per molecule that are conjugated with carbonyl groups. Also, the unsaturated polyester resins can be terminated with one or more carbonyl groups, such as those provided by reaction with aldehydes and ketones.

It is preferred to carry out the reaction of the dialkyl phosphites with unsaturated polyester resins in the presence of an alkaline or anhydrous base catalyst. Examples of suitable catalysts include metallic sodium, potassium, and lithium; the alkali metal amides, such as sodiamide; the alkali metal hydrides, such as sodium hydride and potassium hydride; alkali metal alcoholates (alkoxides), such as sodium methylate and potassium ethylate; sodium naphthalene; the secondary and tertiary amines, such as diethylamine and triethylamine; and the salts of phosphite diesters, such as sodium or potassium diethyl phosphite. The amount of catalyst employed is not critical, provided that a catalytic amount of the catalyst is available during the reaction, usually about 0.5 to 5 weight percent of catalyst based on the weight of the reactants is a satisfactory amount. The unsaturated polyester resins that are preferred for reaction with the dialkyl phosphites are those resins that are substantially completely terminated in carboxylic acid ester groups. Such resins generally contain less than an average of one carboxylic acid group per molecule and thereby avoid consuming the alkaline catalyst used in the reaction. More particularly, these unsaturated polyester resins have an acid number of less than 30, preferably in the range of zero to about ten. These resins also contain at least one and preferably two or more carbon-to-carbon double bonds that are conjugated with a carbonyl group. They can also contain "internal" double bonds that are conjugated with a carbonyl group that does not occur at the end of a polymer chain. Generally, the unsaturated polyester resins used in the preparation of the phosphonated polyesters can contain various proportions of unsaturated components introduced through the acidic component, alcohol or alkenyl phosphite.

The phosphonation temperature can vary over wide ranges, such as from about 20 degrees centigrade up to about 200 to 250 degrees centigrade or higher. Temperatures below about 130 degrees centigrade give better results in some instances. The reaction is carried out for a period of time sufficient to assure the addition of the phosphorous compound to the desired number of carbon-to-carbon double bonds, and reaction times and temperatures are not otherwise critical within the acceptable limits mentioned above. A solvent can be employed, if desired, and in instances where a solvent is employed it can be a material such as an ether, such as diethylether, aromatic hydrocarbons, such as benzene, and the like. The phosphorus compound is added to the unsaturated polymer in a proportion sufficient to impart the desired degree of flame resistance or other desirable properties to the final copolymer product of the invention. Generally, it is preferred that the unsaturated polyester be reacted with a sufficient proportion of phosphorus compound to provide from about 0.5 to about 10 weight percent of phosphorus in the phosphonated polymer.

The unsaturated polyester resins useful in preparing the phosphonated polyesters are preferably the reaction products of a polycarboxylic compound and a polyhydric alcohol. Suitable polycarboxylic compounds and polyhydric alcohols are any of such compounds listed hereinbefore. Also suitable are such polymeric compositions containing drying oils, semi-drying oils and similar unsaturated oils such as linseed oil, tung oil and the like. Unsaturated polyester resins containing more than four esterified carboxylic acid groups are especially preferred.

The compositions of the invention can also include unsaturated polyester resins that contain neither phosphorus nor halogens. Such unsaturated polyester resins are the reaction products of polycarboxylic compounds and polyhydric alcohols. Suitable polycarboxylic compounds and polyhydric alcohols are any of such compounds listed hereinbefore that contain neither phosphorus nor halogens. Such polyesters can be employed to adjust the proportion of phosphorus and halogen content of the compositions of the invention, and to modify the properties of the compositions.

A variety of ethylenically unsaturated monomers can be used for curing or cross-linking the ethylenically unsaturated polyesters. It is generally preferred that addition polymerization be practiced since no by-product ammonia or water is formed, and the problems resulting therefrom are not experienced. The monomers useful in curing the thermoplastic unsaturated polymers include vinylic compounds or mixtures thereof capable of cross-linking ethylenically unsaturated polymer chains at their points of unsaturation. Usually they contain the reactive group

Specific examples include styrene, chlorostyrenes, methyl styrenes such as alpha methyl styrene, p-methyl styrene, divinyl benzene, indene, unsaturated esters such as: methyl methacrylate, methyl acrylate, allyl acetate, diallyl phthalate, diallyl succinate, diallyl adipate, diallyl sebacate, diethylene glycol bis(allylcarbonate), triallyl phosphate and other allyl esters, and vinyl toluene, diallyl chlorendate, diallyl tetrachlorophthalate, the lower aliphatic esters of methacrylic and acrylic acids, ethylene glycol diacrylate, dimethacrylate, diethacrylate, etc. The monomer can be admixed in the polymer in an amount sufficient to produce a thermoset polymer and the admixture heated to an elevated temperature in the presence of a suitable catalyst to cross-link or curve the polymer. With proper catalyst systems such as cobalt naphthenate and methylethyl ketone peroxide, room temperature cures are obtained.

As disclosed hereinbefore, the adduct of hexahalocyclopentadiene can be added in the cross-linking agent. Among such cross-linking agents which can be used for this purpose are the following:

diallyl-1,4,5,6,7,7-hexachlorobicyclo-(2.2.1)-5-heptene-2,3-dicarboxylate;
diallyl-1,4,5,6,7,7-hexachloro-2-methylbicyclo-(2.2.1)-5-heptene-2,3-dicarboxylate;
diallyl-1,2,4,5,6,7,7-heptachlorobicyclo-(2.2.1)-5-heptene-2,3-dicarboxylate; and
triallyl-1,4,5,6,7,7-hexachlorobicyclo-(2.2.1)-5-heptene-2-acetate-2,3-dicarboxylate.

These compounds can be prepared by reacting hexachloropentadiene with the indicated dicarboxylic acid and esterifying the resultant product with an unsaturated alcohol such as allyl alcohol. Other cross-linking agents may advantageously be employed; for example, reaction products of hexachlorocyclopentadiene with isoprene or butadiene retaining a reactive unsaturated linkage can be used as cross-linking agents directly without further reaction.

The proportion of olefinic cross-linking agent to unsaturated polyester can be varied within the ultimate limit of each without departing from the scope of the invention, to produce an infusible, insoluble, polyester resin. In general, the concentration of the unsaturated polyester in the olefinic cross-linking agent can vary between about 10 and 90 percent. Polymerization catalysts are preferably added to the mixture of unsaturated polyester and olefinic cross-linking agent to effect setting or curing. Catalysts such as benzoyl peroxide, acetyl peroxide, lauryl peroxide, methylethyl ketone peroxide, cumene hydroperoxide and the like are satisfactory. Such catalysts are used in proportions of 0.01 to 10 percent of the total resin. The polymerization reaction can also be hastened by adding promoters such as metals or metal salts, cobalt resinates, cobalt maleate, cobalt naphthenate, and the like, or amines such as dibutylamine, or mercaptans such as dodecyl mercaptan. These are used in proportions similar or smaller to that stated for the catalysts.

Various reinforcing media, fillers and/or light stabilizers are preferably employed with the unsaturated polyester resin of the invention. The following are examples of suitable reinforcing media that can be used with the polymers of the invention: glass fibers, glass mats, glass cloth, synthetic fibers such as orlon, mineral fibers such as asbestos, natural fibers such as cotton, silk and wool, and metallic fibers such as aluminum and steel. Following are examples of fillers that can be used in the polymers of the invention: inorganic materials such as calcium carbonate, clay and pigments, and organic materials such as wood flour, cotton and rayon flock, sisal fibers and dyes. Many types of compounds can be used as light stabilizers. Preferred are the 2-hydroxybenzophenones. Novel compounds of this type are disclosed in U.S. Patent 3,094,506.

The foregoing unsaturated polyester resins can be employed in various proportions, as desired for different product applications. However, the resins are generally employed in a proportion to provide at least 0.5 weight percent phosphorus and at least 3 weight percent halogen in the thermoset polymer. Preferably, the proportions are adjusted to provide from about 0.8 to 5 weight percent phosphorus and from about 5 to 20 weight percent halogen. Still more preferably, the compositions contain at least one weight percent phosphorus and at least 10 weight percent halogen.

The following detailed examples serve to further illustrate the invention but are not intended to limit it. Unless specified otherwise, the temperatures are given in degrees centigrade and the parts are by weight.

*Example 1*

Into a suitable reaction vessel were charged 11.1 parts of ethylene glycol, 2.8 parts of diethylene glycol, 47.7 parts of chlorendic acid, 9.6 parts of fumaric acid, and 0.009 part toluhydroquinone. The esterification was carried out at 160 degrees centigrade under an inert atmosphere of carbon dioxide until an acid number of about 25 was reached. The resulting resin was mixed with 27.7 parts of styrene and 8.3 parts of stabilizer containing a 2-hydroxybenzophenone and a neutral alkyl phosphite to provide a polymerizable composition for use in the invention.

In a similar manner, additional halogen containing unsaturated polyester resins are readily prepared, as disclosed in U.S. Patent 2,779,701.

*Example 2*

Glyceryl tris-(1,2-propane diol) hexamaleate was prepared for reaction with trimethyl phosphite as follows.

One mole of glyceryl trimaleate was reacted with 3.2 moles of 1,2-propane diol in the presence of 0.005 mole hydroquinone at a temperature of 135 to 160 degrees centigrade for four hours followed by 160 degrees centigrade at 150 millimeters mercury pressure for 12 hours to complete the removal of water. The acid number of the resulting product was 8.7.

One mole of the glyceryl tris-(1,2-propane diol) trimaleate was reacted with three moles of maleic anhydride at 60 degrees centigrade for six hours, followed by 100 to 120 degrees centigrade for three hours. The resulting hexamaleate had an acid number of 199, and was a clear, pale yellow liquid.

Two and one-half moles of trimethyl phosphite were added drop-wise with stirring to one mole of glyceryl tris-(1,2-propane diol) hexamaleate over a period of two hours at 80 to 90 degrees centigrade. The resulting product was a light yellow liquid.

One hundred parts of the above-described phosphonated polyester were mixed with forty parts of styrene to provide a polymerizable composition suitable for use in preparing the compositions of the invention.

In a similar manner, additional alkylene trialkylene hexamaleates, such as glyceryl tris-(1,3-butane diol) hexamaleate, and phosphonated polyesters based on trimethyl phosphite, tribenzyl phosphite, triallyl phosphite, phenylethylene phosphite, and tricyclohexyl phosphite, are readily prepared, as disclosed in copending application S.N. 158,105, now Patent No. 3,278,464.

*Examples 3 to 10*

In these examples, various proportions of the polymerizable compositions of Examples 1 and 2 were mixed with polypropylene glycol phthalate maleate to provide polyester resin compositions having a variety of proportions of halogen and phosphorus. The resulting polymerizable compositions were cured with one percent benzoyl peroxide for four hours at 80 degrees centigrade, followed by curing for 16 hours at 120 degrees centigrade. The resulting castings were tested for fire retardance by ASTM Test D757–49. The Barcol hardness of each casting was also determined. The following Table I summarizes the proportions of components employed in preparing the compositions and shows the hardness and fire retardance obtained.

TABLE I

| Example No. | 3 | 4 | 5 | 6 | 7 | 8 | 9 | 10 |
|---|---|---|---|---|---|---|---|---|
| Composition of invention, parts by weight: | | | | | | | | |
| Polyester of Example 1 | 77.0 | 154.0 | 77.0 | 115.4 | 154.0 | 38.6 | 77.0 | 38.6 |
| Polyester of Example 2 | 21.4 | 21.4 | 42.6 | 42.6 | 42.6 | 85.2 | 85.2 | 128.0 |
| Polypropylene glycol phthalate maleate* | 101.6 | 24.6 | 80.4 | 42.0 | 3.4 | 76.4 | 37.8 | 33.6 |
| Phosphorus content, weight percent | 0.8 | 1.2 | 1.3 | 1.5 | 1.6 | 2.2 | 2.3 | 3.1 |
| Chlorine content, weight percent | 10 | 20 | 10 | 15 | 20 | 5 | 10 | 5 |
| Barcol Hardness | 42–47 | 42–44 | 45–48 | 44–48 | 42 | 51 | 45–48 | 45–48 |
| Fire Retardance: | | | | | | | | |
| Flame out time, seconds | 180 | 166 | 174 | 162 | 133 | 172 | 139 | 139 |
| Burning rate, in./min | 0.64 | 0.38 | 0.40 | 0.32 | 0.28 | 0.45 | 0.27 | 0.33 |

*Proportions include 50 parts styrene per 100 parts of resin.

Analysis of the data obtained in Examples 3 to 10 indicates that the combination of phosphorus and halogen provides a synergistic effect, that is, it is possible to derive the optimum efficiency from the use of phosphorus and halogen in the compositions of the invention that employ both of these components.

While the invention has been described with reference to certain specific embodiments, it will be recognized by those skilled in the art that many variations are possible without departing from the spirit and scope of the invention.

We claim:

1. A composition for use in preparing thermoset polymers comprising (A) an unsaturated polyester resin having reacted therein an adduct of hexahalocyclopentadiene and a dienophile having a plurality of functional groups capable of esterification, wherein the halogen is selected from at least one member of the group consisting of fluorine, chlorine and bromine; and (B) an unsaturated polyester resin comprising the reaction product of (1) a reactive phosphite of the formula $(RO)_3P$ wherein each R is independently selected from the group consisting of alkyl, cycloalkyl, alkenyl, aryl, alkyl-aryl, arylalkyl, haloalkyl, alkoxyalkyl and aryloxy-alkyl, and (2) an unsaturated polyester resin which contains aliphatic carbon-to-carbon double bonds that are conjugated with carbonyl groups, said resin being reacted with an insufficient amount of phosphorus compound to react with all the carbon-to-carbon double bonds, and the resulting unsaturated phosphonated polyester containing aliphatic carbon-to-carbon double bonds, and phosphorus atoms attached directly to carbon atoms which were present in the resin prior to the reaction with the phosphorus compound; wherein the halogen-containing polyester resin and the phosphorus-containing polyester resin are employed in a proportion to provide at least 0.5 weight percent phosphorus and at least 3 weight percent halogen in the thermoset polymer.

2. The composition of claim 1 wherein the halogen-containing unsaturated polyester resin is comprised of the reaction product of (1) an adduct of hexahalocyclopentadiene and a polycarboxylic compound containing aliphatic carbon-to-carbon unsaturation, (2) a polycarboxylic compound containing aliphatic carbon-to-carbon unsaturation, and (3) a polyhydric alcohol.

3. The composition of claim 2 wherein the adduct of hexahalocyclopentadiene and the polycarboxylic compound is 1,4,5,6,7,7-hexachlorobicyclo-(2.2.1)-5-heptene-2,3-dicarboxylic acid.

4. The composition of claim 3 wherein the component (2) is fumaric acid.

5. The composition of claim 1 wherein the unsaturated polyester resin (2) contains at least one carboxylic acid group per molecule that is conjugated with an aliphatic carbon-to-carbon double bond.

6. The composition of claim 5 wherein the phosphite is trimethyl phosphite.

7. The composition of claim 5 wherein the unsaturated polyester resin (2) is an alkylene trialkylene hexamaleate.

8. The composition of claim 6 wherein the unsaturated polyester resin (2) is glyceryl tris(propanediolhexamaleate).

9. A polymerizable composition comprising a liquid ethylenically unsaturated monomer and the composition of claim 1.

10. The thermoset polymer prepared by copolymerizing the polymerizable composition of claim 9 in the presence of a free radical catalyst.

11. The thermoset polymer of claim 10 containing from about 0.8 to 5 weight percent phosphorus and from about 5 to 20 weight percent halogen.

12. The thermoset composition of claim 11 wherein the halogen-containing polyester resin is comprised of the reaction product of (1) an adduct of hexahalocyclopentadiene and a polycarboxylic compound containing aliphatic carbon-to-carbon unsaturation, (2) a polycarboxylic compound containing aliphatic carbon-to-carbon unsaturation, and (3) a polyhydric alcohol.

13. The composition of claim 12 wherein the unsaturated polyester resin (2) contains at least one carboxylic acid group per molecule that is conjugated with an aliphatic carbon-to-carbon double bond.

14. The composition of claim 13 wherein the adduct of hexahalocyclopentadiene is 1,4,5,6,7,7-hexachlorobicyclo-(2.2.1)-5-heptene-2,3-dicarboxylic acid, and the phosphite is trimethyl phosphite.

No references cited.

SAMUEL H. BLECH, *Primary Examiner.*

J. T. GOOLKASIAN, *Assistant Examiner.*